United States Patent
Greer, Jr. et al.

(10) Patent No.: US 7,406,751 B2
(45) Date of Patent: Aug. 5, 2008

(54) LINE TENSIONING SYSTEMS AND METHODS

(75) Inventors: Lester R. Greer, Jr., Bellingham, WA (US); Randal W. Hanson, Bellingham, WA (US); Wilfred Joseph Hoffmann, Blaine, WA (US)

(73) Assignee: Homax Products, Inc., Bellingham, WA (US)

( * ) Notice: Subject to any disclaimer, the term of this patent is extended or adjusted under 35 U.S.C. 154(b) by 186 days.

(21) Appl. No.: 11/044,361

(22) Filed: Jan. 26, 2005

(65) Prior Publication Data

US 2005/0161653 A1    Jul. 28, 2005

Related U.S. Application Data

(60) Provisional application No. 60/539,802, filed on Jan. 28, 2004.

(51) Int. Cl.
*F16G 11/04* (2006.01)
(52) U.S. Cl. .................................................. 24/130
(58) Field of Classification Search ................. None
See application file for complete search history.

(56) References Cited

U.S. PATENT DOCUMENTS

| | | | | |
|---|---|---|---|---|
| 4,120,077 A | * | 10/1978 | Fink | 24/130 |
| 4,361,938 A | * | 12/1982 | Emery | 24/130 |
| 5,230,295 A | * | 7/1993 | Shell | 114/218 |
| D466,792 S | | 12/2002 | Knopp | |

* cited by examiner

*Primary Examiner*—Jack W. Lavinder
(74) *Attorney, Agent, or Firm*—Michael R. Schacht; Schacht Law Office, Inc.

(57) ABSTRACT

A tensioning device for applying tension to a line extending between first and second objects. The tensioning device comprises a first engaging portion, a support surface, and first and second gripping portions defining a gripping notch. The first engaging portion is adapted to be connected to the first object. The support surface is adapted to support the line. The gripping notch is located adjacent to the support surface. The support surface supports the line to define a first line portion extending in a first direction, a second line portion in contact with the support surface, and a third line portion extending in a second direction. The third line portion is adapted to support the second object. The first line portion is pulled to place the line under tension. The gripping notch is arranged to engage the first line portion to inhibit movement of the line relative to the support surface.

17 Claims, 3 Drawing Sheets

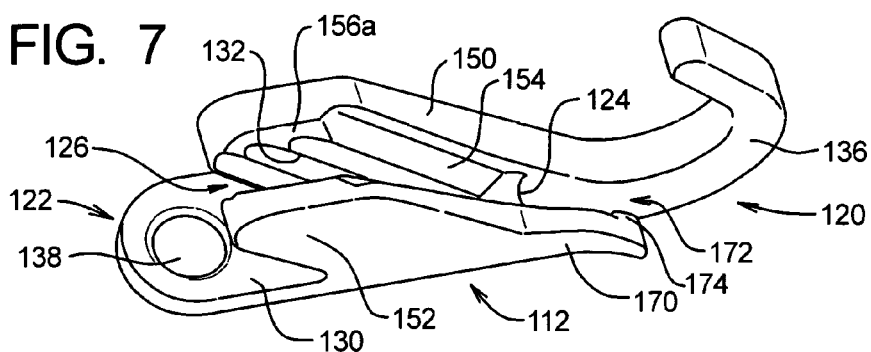
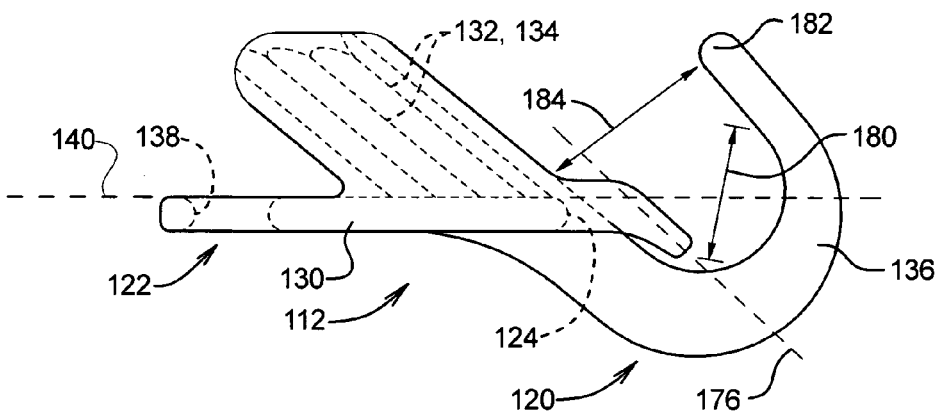
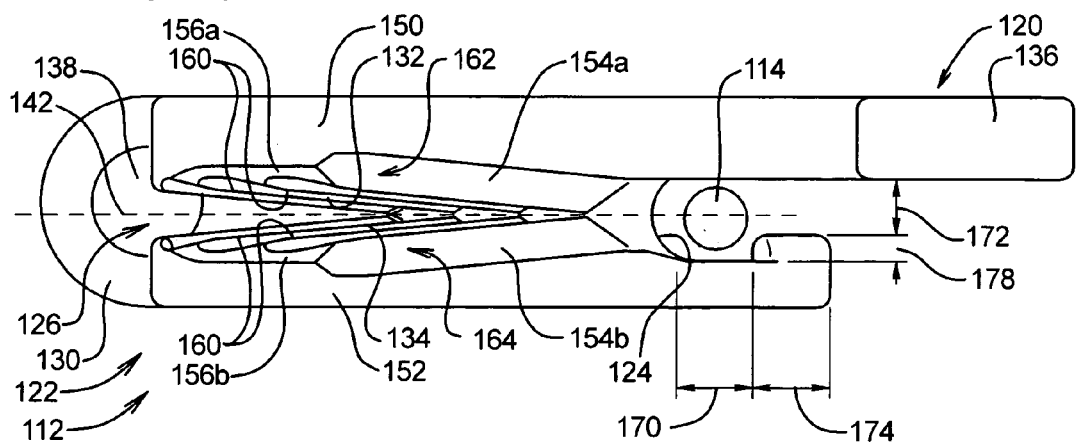
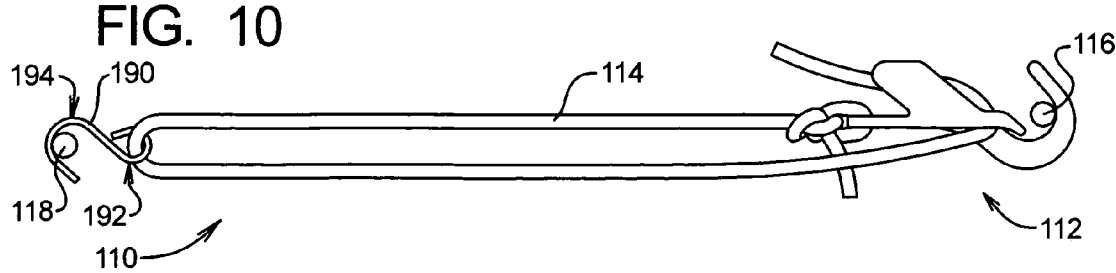

LINE TENSIONING SYSTEMS AND METHODS

RELATED APPLICATIONS

This application claims priority of U.S. Provisional Patent Application Ser. No. 60/539,802 filed Jan. 28, 2004.

TECHNICAL FIELD

The present invention relates to tensioning systems and methods and, more specifically, to tensioning systems and methods that allow tension to be applied to a line extending between two objects.

BACKGROUND OF THE INVENTION

In many situations, a line such as a rope, cable, or the like is tied to two different objects. Often, the line is placed in tension to reduce slack in the line, move one or both of the objects towards the other, and/or to fix a maximum distance between the two objects.

For example, a line may be engaged with an object such as a bike and suspended from a first fixed location such as a rafter in a garage. Pulling on the line can raise the bike relative to the fixed location. Further, securing a portion of the line relative to a second fixed location can fix the distance between the bike and the first fixed location. The bike may thus be lifted into a storage location by pulling on the line and then fixed in the storage location by tying the line off.

A variety of hardware devices have been developed to facilitate the use of a line to connect two objects. A single wheel pulley can be used to reduce friction when changing direction of a line under tension. Multiple wheel pulleys can be used to provide a mechanical advantage when a line is placed under tension. Hooks, eyelets, cleats, and the like can all be used to secure a line at a desired location.

The need exists for general purpose hardware devices that facilitate the use of a line to connect two objects.

SUMMARY OF THE INVENTION

The present invention may be embodied as a tensioning device for applying tension to a line extending between first and second objects. The tensioning device comprises a first engaging portion, a support surface, and first and second gripping portions defining a gripping notch. The first engaging portion is adapted to be connected to the first object. The support surface is adapted to support the line. The gripping notch is located adjacent to the support surface. The support surface supports the line to define a first line portion extending in a first direction, a second line portion in contact with the support surface, and a third line portion extending in a second direction. The third line portion is adapted to support the second object. The first line portion is pulled to place the line under tension. The gripping notch is arranged to engage the first line portion to inhibit movement of the line relative to the support surface.

BRIEF DESCRIPTION OF THE DRAWINGS

FIG. 7 is a perspective view of a tensioning device constructed in accordance with a second embodiment of the present invention;

FIG. 8 is a side elevation view of the tensioning device of FIG. 7;

FIG. 9 is a plan view of the tensioning device of FIG. 7; and

FIG. 10 is a side elevation view depicting a tensioning system and method using the tensioning device of FIG. 7.

DETAILED DESCRIPTION OF THE INVENTION

Figure 1:
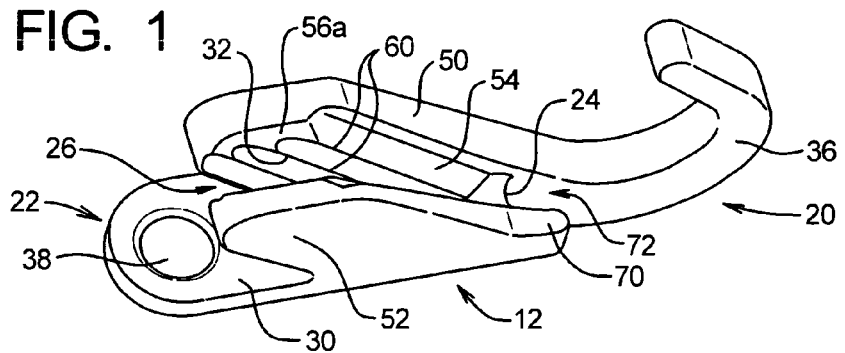
FIG. 1 is a perspective view of a tensioning device constructed in accordance with a first embodiment of the present invention.
Figure 2:
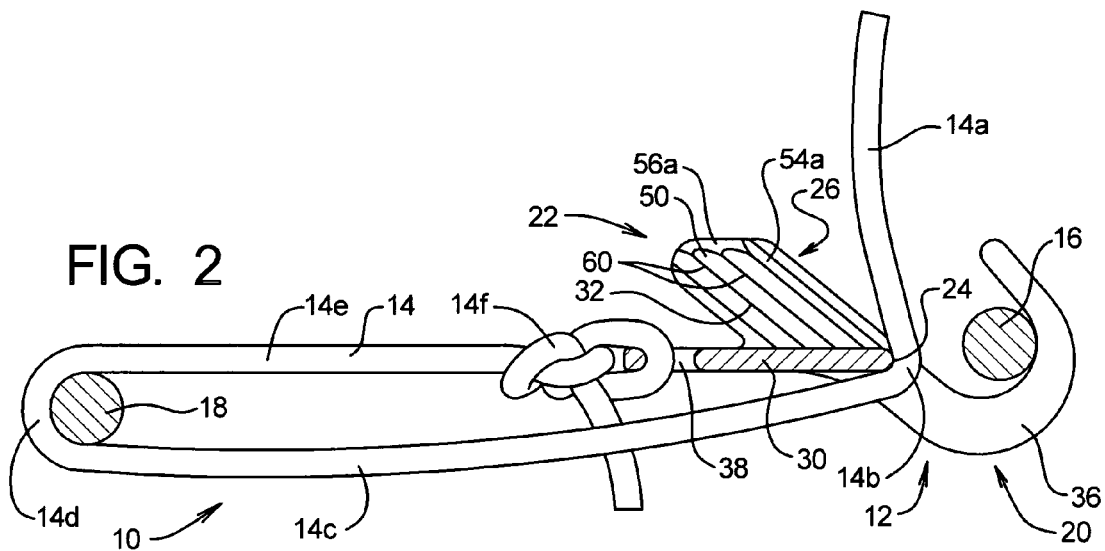
FIG. 2 is a side elevation, partial cutaway view depicting a tensioning system and method using the tensioning device of FIG. 1.
Figure 3:
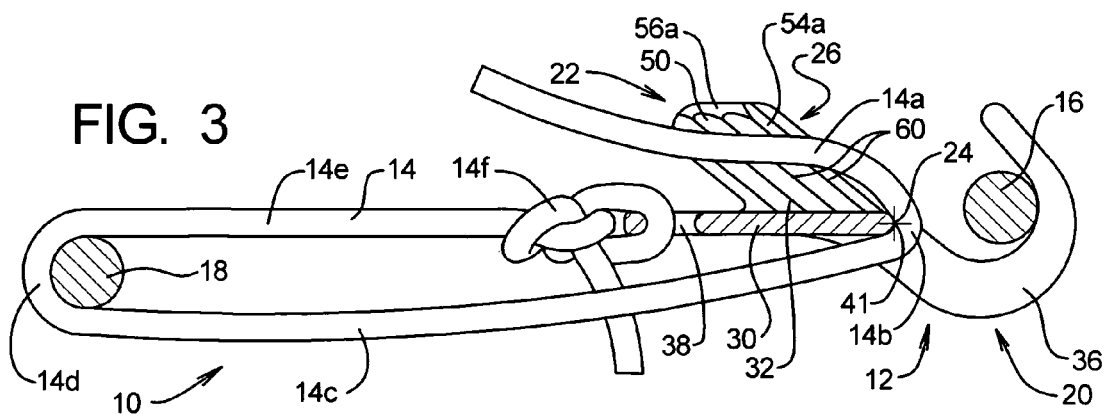
FIG. 3 is a side elevation, partial cutaway view depicting the tensioning system and method of FIG. 2 in a locked configuration.

Referring initially to FIGS. 2 and 3, depicted therein is a line tensioning system 10 of a first embodiment of the present invention. The line tensioning system 10 employs a line tensioning device 12 as further shown in FIGS. 1-6. The line tensioning device 12 allows a line 14 extending between a first object 16 and a second object 18 to be placed under tension.

The line tensioning device 12 will now be described in detail with respect to FIGS. 1-6. The line tensioning device 12 comprises a first engaging portion 20, an optional second engaging portion 22, a support surface 24, and a gripping notch 26.

In one example of the use of the device 12, the first engaging portion 20 is secured to the first object 16 and the second engaging portion 22 is secured to one end of the line 14. The line 14 is then engaged with the second object 18 and passed over the support surface 24. As a tension force is applied to the line 14, the support surface 24 changes the direction of effort of the tension force.

As shown in FIGS. 2 and 3, with the line 14 supported by the support surface 24, the line 14 defines a first line portion 14a, a second line portion 14b, a third line portion 14c, a fourth line portion 14d, a fifth line portion 14e, and a sixth line portion 14f. The line portions 14a-14f do not identify fixed locations on the rope 14, but are instead dynamically defined by the relationship between the device 12 and the line 14 under a particular set of conditions.

In the example system 10 as depicted in FIGS. 2 and 3, the first line portion 14a is located on the same side of the device 12 as the gripping notch 26. The second line portion 14b is in contact with the support surface 24. The third line portion 14c extends to and supports the second object 18. In the example shown in FIGS. 2 and 3, the line 14 extends around the second object 18 such that the fourth line portion 14d is in contact with the second object 18. The fifth line portion 14e extends between the second object and the second engaging portion 22. The sixth line portion 14f forms a knot that secures the line to the second engaging portion 22.

When the line tensioning system 10 is in an unlocked mode (FIG. 2), the first portion 14a of the line 14 does not engage the gripping notch 26, and the line 14 is allowed to move in either direction over the support surface 24. When the line 14 slides in a first direction over the support surface 24, the tension on the line 14 is increased. When the line 14 slides in a second direction over the support surface 24, the tension on the line 14 is decreased. Increasing the tension on the line 14 applies opposing forces on the first and second objects 16 and 18. Decreasing the tension on the line 14 creates slack in the line 14 and/or allows relative movement of the objects 16 and 18 away from each other.

The first portion 14a of the line 14 is pulled into the gripping notch 26 to place the line tensioning system 10 in a locked mode as shown in FIG. 3. The gripping notch 26 engages the first line portion 14a to inhibit movement of the line 14 relative to the device 12 and in particular the support surface 24. Movement of the line 14 in either direction over the support surface 24 is thus inhibited when the system 10 is in the locked mode. When in the locked mode, the system 10 can thus substantially maintain a desired tension on the line 14 under anticipated operating conditions.

Typically, the system 10 is placed in the unlocked mode to apply a desired tension on the line 14. The system 10 is then placed in the unlocked mode to maintain the desired tension on the line 14. When necessary, the system 10 may be placed back in the unlocked mode to allow the line to be slid in the second direction over the support surface 24 to at least momentarily reduce the tension on the line 14.

Depending upon the nature of the first and second objects 16 and 18, the line tensioning system 10 removes slack from the line 14, moves one of the first and second objects 16 and 18 towards each other, or fixes a maximum distance between the objects 16 and 18.

As one example of the use of the system 10, if the first and second objects 16 and 18 are a tie-down point and an eyelet on a tarp, the line 14 will be placed under tension and the tarp will be held securely in a desired position. As another example, if the first and second objects 16 and 18 are a fixed overhead hook and a bicycle frame, respectively, the bicycle will be lifted towards the overhead hook. The citation of these examples is not intended to limit the scope of the invention as claimed, however, and the line tensioning system 10 and line tensioning device 12 may be used in many environments and in many configurations.

In addition, in the example illustrated in FIGS. 2 and 3, the line 14 is passed over the second object 18 and connected to the second connecting portion 22 to define the fourth, fifth, and sixth line portion 14d, 14e, and 14f. These fourth, fifth, and sixth line portions 14d, 14e, and 14f allow the third line portion 14c to directly support the second object 18. As alternatives, the third line portion 14c may be directly connected to the second object 18 or may be connected to another device that is in turn connected to the second object 18. The use of the fourth, fifth, and sixth line portions 14d, 14e, and 14f and the second connecting portion 22 is thus optional depending upon the circumstances.

The tensioning device 12 is thus similar to a single wheel pulley in function but, because it is made of a single part with no moving pieces, is less expensive, more rugged, and simpler to use. The tensioning device 12 also provides a simple mechanism for, at least temporarily, fixing a desired tension on the line 14.

With the foregoing general understanding of the operation of the system 10, the details of construction and operation of the example line tensioning device 12 will now be described.

The example line tensioning device 12 comprises a base portion 30 and defines first and second gripping surfaces 32 and 34 that define the gripping notch 26. The line tensioning device 12 further comprises a hook projection 36 and an opening 38. The hook projection 36 extends from the base portion 30 and defines the first engaging portion 20. The opening 38 is formed in the base portion 30 and defines the second engaging portion 22. Other objects or shapes may be used to form the engaging portions 20 and 22 depending upon the nature of the line 14 and first object 16.

Figure 4:
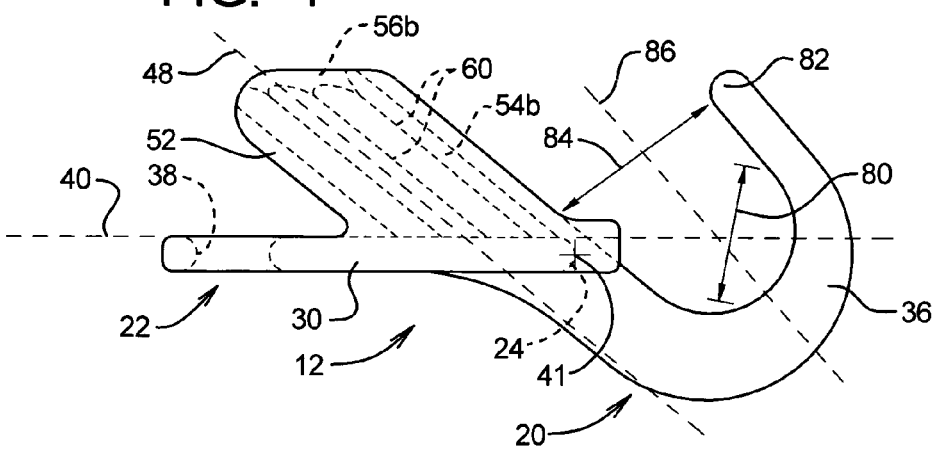
FIG. 4 is a side elevation view of the tensioning device of FIG. 1.
Figure 5:
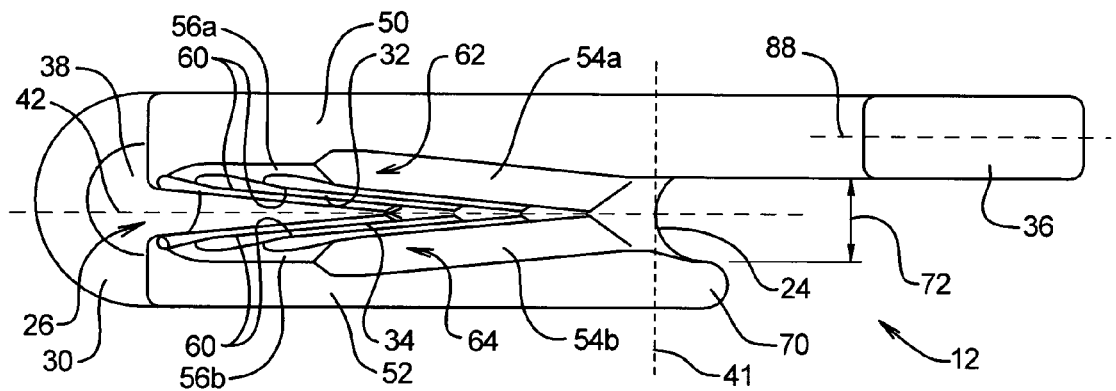
FIG. 5 is a plan view of the tensioning device of FIG. 1.
Figure 6:
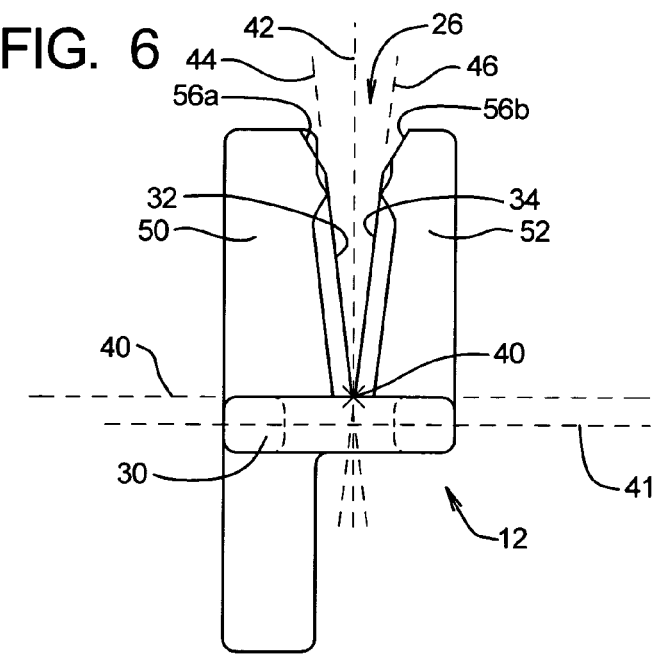
FIG. 6 is an end elevation view of the tensioning device of FIG. 1.

The base portion 30 of the example device 10 defines a main device axis 40 (FIGS. 4 and 6). As shown in FIGS. 2-6, the support surface 24 defines a slide axis 41 around which the line 14 turns when the line 14 is pulled against the support surface 24. The example slide axis 41 is substantially perpendicular to the system axis 40.

The gripping notch 26 defines a notch reference plane 42 (FIGS. 5 and 6) that is parallel to and extends through the main device axis 40. The first and second gripping surfaces 32 and 34 define first and second gripping planes 44 and 46 (FIG. 6) that are parallel to and intersect at the main device axis 40. The gripping planes 44 and 46 are canted with respect to the notch reference plane 42. The gripping surfaces further define a gripping portion axis 48 (FIG. 4) that lies within the notch reference plane 42 and is canted with respect to the main device axis 40.

The support surface 24 and the opening 38 are spaced from each other along the main device axis 40. The first and second gripping surfaces 32 and 34 lie generally within portions of the first and second gripping planes 44 and 46 between the support surface 24 and the opening 38 along the main device axis. The hook projection 36 is spaced along the main device axis 40 on the opposite side from the opening 38.

The geometry of the example tensioning device 12 as described above represents a desirable blend of manufacturing and operational characteristics; however, other geometries may be employed by a tensioning device constructed within the scope of the present invention.

Referring now to FIGS. 1, 5, and 6, it can be seen that the device 12 comprises first and second gripping portions 50 and 52 that extend from the base portion 30 to define the first and second gripping surfaces 32 and 34. Each of the gripping portions 50 and 52 defines a leading surface 54 and an opening surface 56.

The leading surfaces 54 are arranged adjacent to the support surface 24 along the gripping notch 26. The leading surfaces 54 are canted towards the gripping notch 26 such that, when the line 14 is moved to change the system 10 from the unlocked mode into the locked mode, the leading surfaces 54 guide the line 14 into the gripping notch 26.

The opening surfaces 56 extend along the ends of the gripping portions 50 and 52 distal from the base portion 30. The opening surfaces 56 are also canted towards the gripping notch 26. After a first portion of the line 14 enters the gripping notch 26 past the leading surfaces 54, a second portion of the line 14 enters the gripping notch 26 past the opening surfaces 56. The opening surfaces 56 guide this second portion of the line 14 into the notch 26 such that a larger portion of the line 14 engages the gripping surfaces 32 and 34.

The gripping surfaces 32 and 34 are designed to frictionally engage the line to inhibit movement of the line 14 relative to the line tensioning device 12. In particular, the gripping surfaces 32 and 34 represent a favorable mix of a number of factors given the types of line used and the size of the loads to be encountered. The factors to be considered include the material(s) used, the texturing of the surfaces, the shape of the surfaces, and the like.

The example gripping surfaces 32 and 34 are made of a relatively smooth, rigid material that does not naturally yield a high coefficient of friction. Accordingly, gripping teeth 60 are formed in first and second sets 62 and 64 on the gripping surfaces 32 and 34, respectively. The teeth 60 extend generally transverse to the line 14 when the system 10 is in the locked mode (FIG. 3). The teeth 60 deform the line 14 to increase the friction between the surfaces 32 and 34 and the line 14 and/or binding forces exerted by the surfaces 32 and 34 on the line 14.

In addition, the example gripping surfaces 32 and 34 are angled with respect to the notch reference plane 42 as described above. The teeth 60 are thus also angled inwardly towards the bottom of the notch 26 such that, as the line 14 is pulled further into the gripping notch 26, the teeth 60 extend deeper into the line 14. The deeper penetration of the teeth 60 into the line 14 increases the friction and/or binding forces between the surfaces 32 and 34 and the line 14.

In the example device 12, the hook projection 36 extends from the base portion 30 adjacent to the support surface 24 on the first gripping portion 50. Extending from the base portion 30 on the other side of the support surface 24 adjacent to the second gripping portion 52 is a guide lip 70. A guide passageway 72 is thus defined between the guide lip 70 and the hook projection 36. The guide passageway 72 guides the line 14 to the support surface 24 and helps maintain the line 14 in contact with the support surface 24 as the line 14 is displaced relative to the device 12 when the system 10 is in the unlocked mode.

The hook projection 36 is adapted to facilitate securing the line tensioning device 10 to the first object 16 and may be formed in many sizes, shapes, and materials depending upon the characteristics of the first object 16. As perhaps best shown in FIGS. 4 and 5, the example hook projection 36 is integrally formed with the base portion 30. The hook projection 36 is gradually curved from the base portion 30 to define a hook surface 80 and terminates in a hook tip 82. The base reference axis 40 extends through the hook surface 80. A hook opening 84 is defined between the hook tip 82 and the first gripping portion 50. The hook opening 84 in turn defines a hook axis 86.

To secure the example line tensioning device 12 relative to the first object 16, the device 12 is displaced relative to the first object 16 along the hook axis 86 until the object 16 comes into contact with the hook surface 80. When the line 14 is secured to the base portion 30 (e.g., looped through the opening 38 and knotted) and passed around the second object 18 and then over the support surface 24 as shown in FIG. 3, loads transmitted from the line 14 to the first object 16 are borne primarily by the base portion 30.

The hook projection 36 further defines a hook reference plane 88 (FIG. 5). In the example line tensioning device 12, the hook reference plane 88 is offset from the notch reference plane 42. Accordingly, when the system 10 applies tension to the line 14, the notch axis 42 will be angled slightly with respect to a line axis defined by the portion of the line 14 extending between the second engaging portion 22 and the second object 18. This angle will create a slight increase in friction and/or binding forces between the line 14 and the gripping surfaces 32 and 34 as the tension on the line 14 increases.

While the line tensioning device 12 may be made of a variety of materials and using a variety of manufacturing techniques, the example line tensioning device 12 is made of injection-molded plastic. In this respect, to simplify the molding process, the hook axis 86 and friction plate axis 48 are substantially parallel as shown in FIG. 4. While this configuration is easy and inexpensive to manufacture, other configurations of the line tensioning device 12 can be made that fall within the scope of the present invention.

Referring now to FIG. 10, depicted therein is a line tensioning system 110 of a second embodiment of the present invention. The line tensioning system 110 employs a line tensioning device 112 as further shown in FIGS. 7-9. The line tension system 110 and line tensioning device 112 are constructed and function in the same basic manner as the line tensioning system 10 and line tensioning device 12 described above. The reference characters used with reference to the system 10 will be increased by 100 and used to identify like components of the system 110.

The line tensioning device 112 comprises a first engaging portion 120, a second engaging portion 122, a support surface 124, and a gripping notch 126.

The line 114 is pulled into the gripping notch 126 to place the line tensioning system 110 in a locked mode. The system 110 is placed in the unlocked mode to apply a desired tension on the line 114 and thereby maintain the desired tension on the line 114. If necessary, the system 110 may be placed back in the unlocked mode to allow the line to be slid in the second direction over the support surface 124 to at least momentarily reduce the tension on the line 114.

The example line tensioning device 112 comprises a base portion 130 and defines first and second gripping surfaces 132 and 134 that define the gripping notch 126. The line tensioning device 112 further comprises a hook projection 136 and an opening 138. The hook projection 136 extends from the base portion 130 and defines the first engaging portion 120. The opening 138 is formed in the base portion 130 and defines the second engaging portion 122. Other objects may be used to form the engaging portions 120 and 122 depending upon the nature of the line 114 and first object 116.

The base portion 130 of the example device 110 defines a main device axis 140 (FIG. 8). The gripping notch 126 defines a notch reference plane 142 (FIG. 9) that is parallel to and extends through the main device axis 140. The support surface 124 and the opening 138 are spaced from each other along the main device axis 140. The hook projection 136 is spaced along the main device axis 140 on the opposite side from the opening 138.

Referring now to FIGS. 7 and 9, it can be seen that the device 112 comprises first and second gripping portions 150 and 152 that extend from the base portion 130 to define the first and second gripping surfaces 132 and 134. Each of the gripping portions 150 and 152 defines a leading surface 154 and an opening surface 156.

Gripping teeth 160 are formed in first and second sets 162 and 164 on the gripping surfaces 132 and 134, respectively. The teeth 160 extend generally transverse to the line 114 when the system 110 is in the locked mode. The teeth 160 deform the line 114 to increase the friction and/or binding forces between the surfaces 132 and 134 and the line 114.

The example gripping surfaces 132 and 134 are angled with respect to the notch reference plane 142 as described above. The teeth 160 are thus also angled inwardly towards the bottom of the notch 126 such that, as the line 114 is pulled further into the gripping notch 126, the teeth 160 extend deeper into the line 114. The deeper penetration of the teeth 160 into the line 114 increases the friction between the surfaces 132 and 134 and the line 114.

In the example device 112, the hook projection 136 extends from the base portion 130 adjacent to the support surface 124 on the first gripping portion 150. Extending from the base portion 130 on the other side of the support surface 124 adjacent to the second gripping portion 152 is a guide lip 170. A guide passageway 172 is thus defined between the guide lip 170 and the hook projection 136. The guide passageway 172 guides the line 114 to the support surface 124 and helps maintain the line 114 in contact with the support surface 124 as the line 114 is displaced relative to the device 112 when the system 110 is in the unlocked mode.

In addition, as perhaps best shown in FIG. 9, a retainer extension 174 extends from the guide lip 70. FIG. 8 illustrates that the retainer extension 174 defines a retainer axis 176 that is canted with respect to the base reference axis 140 away from the gripping notch 26. The retainer extension 174 increases the length of the guide passageway 172 and thus helps retain the line 14 within the passageway 172.

FIG. 9 also shows that a retainer projection 178 can be formed on the retainer extension 174. The retainer projection 178 slightly narrows the guide passageway 172 at a point distal from the support surface 124. The narrowed guide passageway 172 allows the line 14 to reach the support surface 124, and the line 14 can be pulled out of the guide passageway 172 past the retainer extension 174 when desired. However, because of the restriction presented by the retainer projection 178, the line 14 is less likely to fall or be pulled out of the guide passageway 172 accidentally when tension is being applied to the line 14.

Like the hook projection 36 described above, the hook projection 136 is gradually curved from the base portion 130 to define a hook surface 180 and terminates in a hook tip 182. The base reference axis 140 extends through the hook surface 180. A hook opening 184 is defined between the hook tip 182 and the first gripping portion 150.

In the second exemplary line tensioning system 110, a line hook 190 is provided. The line 14 extends through a loop portion 192 of the line hook 190 rather than directly around the second object 118. The line hook 190 further defines a hook portion 194 that is adapted to engage a wide variety of objects.

What is claimed is:

1. A tensioning device for applying tension to a line extending between first and second objects, comprising:
    a first engaging portion adapted to be connected to the first object;
    a support surface adapted to support the line;
    a guide lip, where the first engaging portion and the guide lip define a guide passageway;
    first and second gripping portions defining a gripping notch located adjacent to the support surface; and
    a retainer projection that forms a restricted portion of the guide passageway; whereby
    the support surface supports the line to define
        a first line portion extending in a first direction,
        a second line portion in contact with the support surface, and
        a third line portion extending in a second direction, where the third line portion is adapted to support the second object;
    the first line portion is pulled to place the line under tension;
    the gripping notch is arranged to engage the first line portion to inhibit movement of the line relative to the support surface; and
    the guide passageway guides the line towards the support surface.

2. A tensioning device as recited in claim 1, in which the first and second gripping portions define first and second gripping surfaces, respectively, where the gripping surfaces are configured to inhibit movement of the line relative to the support surface when the gripping notch receives the first line portion.

3. A tensioning device as recited in claim 2, in which the first and second gripping surfaces define first and second gripping planes, respectively, where the gripping planes are angled with respect to each other.

4. A tensioning device as recited in claim 2, in which the first and second gripping surfaces define gripping teeth configured to engage the first line portion to inhibit movement of the line relative to the support surface.

5. A tensioning device as recited in claim 4, in which gripping teeth are angled with respect to the first line portion when the gripping notch receives the first line portion.

6. A tensioning device as recited in claim 1, in which the line engages the second object to define a fourth line portion in contact with the second object.

7. A tensioning device as recited in claim 6, in which the line engages the second object to define a fifth line portion that extends between the second object and the first object.

8. A tensioning device as recited in claim 7, further comprising a second engaging portion, where the line comprises a sixth line portion that is secured to the second engaging portion.

9. A tensioning device as recited in claim 1, in which the first engaging portion comprises a hook projection.

10. A tensioning device as recited in claim 1, further comprising a second engaging portion adapted to allow the line to be connected to the tensioning device.

11. A tensioning device as recited in claim 10, in which the second engaging portion comprises an opening formed in the tensioning device.

12. A method of applying tension to a line extending between first and second objects, comprising the steps of:
    providing a tensioning device defining a first engaging portion, a support surface, a guide lip, and first and second gripping portions defining a gripping notch located adjacent to the support surface, where the first engaging portion and the guide lip define a guide passageway;
    connecting the first engaging portion to the first object;
    configuring the line to define a first line portion, a second line portion, and a third line portion;
    displacing the second line portion along the guide passageway such that the second line portion engages the support surface;
    supporting the second object from the third line portion;
    pulling the first line portion to place the line under tension; and
    displacing the first line portion into the gripping notch such that the gripping portions engage the first line portion to inhibit movement of the line relative to the support surface.

13. A method as recited in claim 12, further comprising the step of forming first and second gripping surfaces on the first and second gripping portions, respectively, such that the gripping surfaces engage the line to inhibit movement of the line relative to the support surface.

14. A method as recited in claim 13, in which the first and second gripping surfaces define first and second gripping planes, respectively, where the gripping planes are angled with respect to each other.

15. A method as recited in claim 14, further comprising the step of forming gripping teeth on the first and second gripping surfaces, respectively, where the gripping teeth engage the first line portion to inhibit movement of the line relative to the support surface.

16. A method as recited in claim 12, further comprising the step of forming a retainer projection on the guide lip.

17. A tensioning device for applying tension to a line extending between first and second objects, comprising:
    a first engaging portion adapted to be connected to the first object;
    a second engaging portion adapted to be connected to the line;
    a support surface adapted to support the line;
    a guide lip, where the first engaging portion and the guide lip define a guide passageway;

first and second gripping portions defining a gripping notch located adjacent to the support surface; and a retainer projection that forms a restricted portion of the guide passageway; whereby the support surface supports the line to define
- a first line portion extending in a first direction,
- a second line portion in contact with the support surface, and
- a third line portion extending in a second direction, where the third line portion is adapted to support the second object;

the first line portion is pulled to place the line under tension;

the gripping notch is arranged to engage the first line portion to inhibit movement of the line relative to the support surface; and the guide passageway guides the line towards the support surface.

* * * * *